Dec. 14, 1943.  S. SCHNELL  2,336,892
FLUID PRESSURE ACTUATING SYSTEM
Filed March 28, 1942   3 Sheets-Sheet 2

INVENTOR
STEVE SCHNELL
BY
ATTORNEY

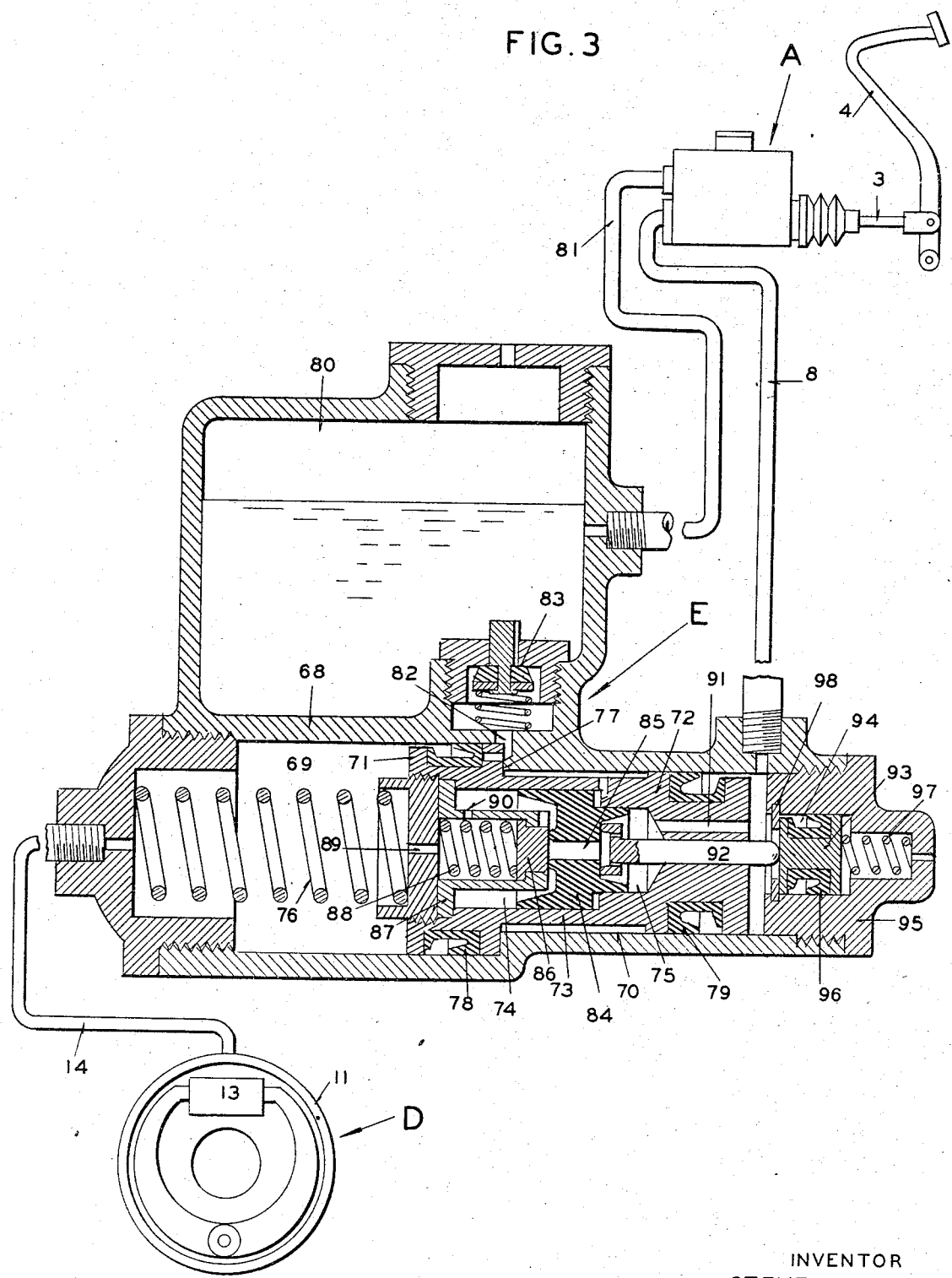

Patented Dec. 14, 1943

2,336,892

UNITED STATES PATENT OFFICE 2,336,892

FLUID PRESSURE ACTUATING SYSTEM

Steve Schnell, Kirkwood, Mo., assignor to Wagner Electric Corporation, St. Louis, Mo., a corporation of Delaware Application March 28, 1942, Serial No. 436,635

14 Claims. (Cl. 60—54.5)

My invention relates to fluid pressure actuating systems and more particularly to a system in which a large volume of fluid can be displaced during the initial operation of the system and then a smaller volume of fluid during later operation.

One of the objects of my invention is to produce an improved fluid pressure actuating system in which means are so associated with a master cylinder device that a large volume of fluid will be displaced to actuate a device for each increment of movement of the piston of the master cylinder when said piston is moved through a portion of its protractile stroke and a smaller volume of fluid will be displaced for each similar increment of movement of the piston when it is moved through the remainder of its protractile stroke.

Another object of my invention is to provide a fluid displacing means for a fluid pressure actuating system which will result in the fluid pressure developed by the fluid pressure producing device, when initially operated, to apply pressure to and displace a large volume of trapped fluid to actuate a fluid motor and upon the attainment of a predetermined pressure to automatically result in the fluid under pressure in the pressure producing device to be placed in communication with the trapped fluid to continue the actuation of the fluid motor and in accordance with the volume of fluid being displaced by the pressure producing device.

Yet another object of my invention is to produce an improved fluid pressure actuating system which embodies means permitting a compounding action on the fluid pressure employed to actuate a fluid motor and to associate therewith means for limiting the fluid pressure which can be effective to actuate said motor.

Still another object of my invention is to embody a large volume displacing means in a fluid pressure actuating system which will automatically become ineffective to create fluid pressure when a predetermined pressure is obtained and subsequently return to its normally inoperative condition during the continued development of fluid pressure above the predetermined value.

Figure 1:
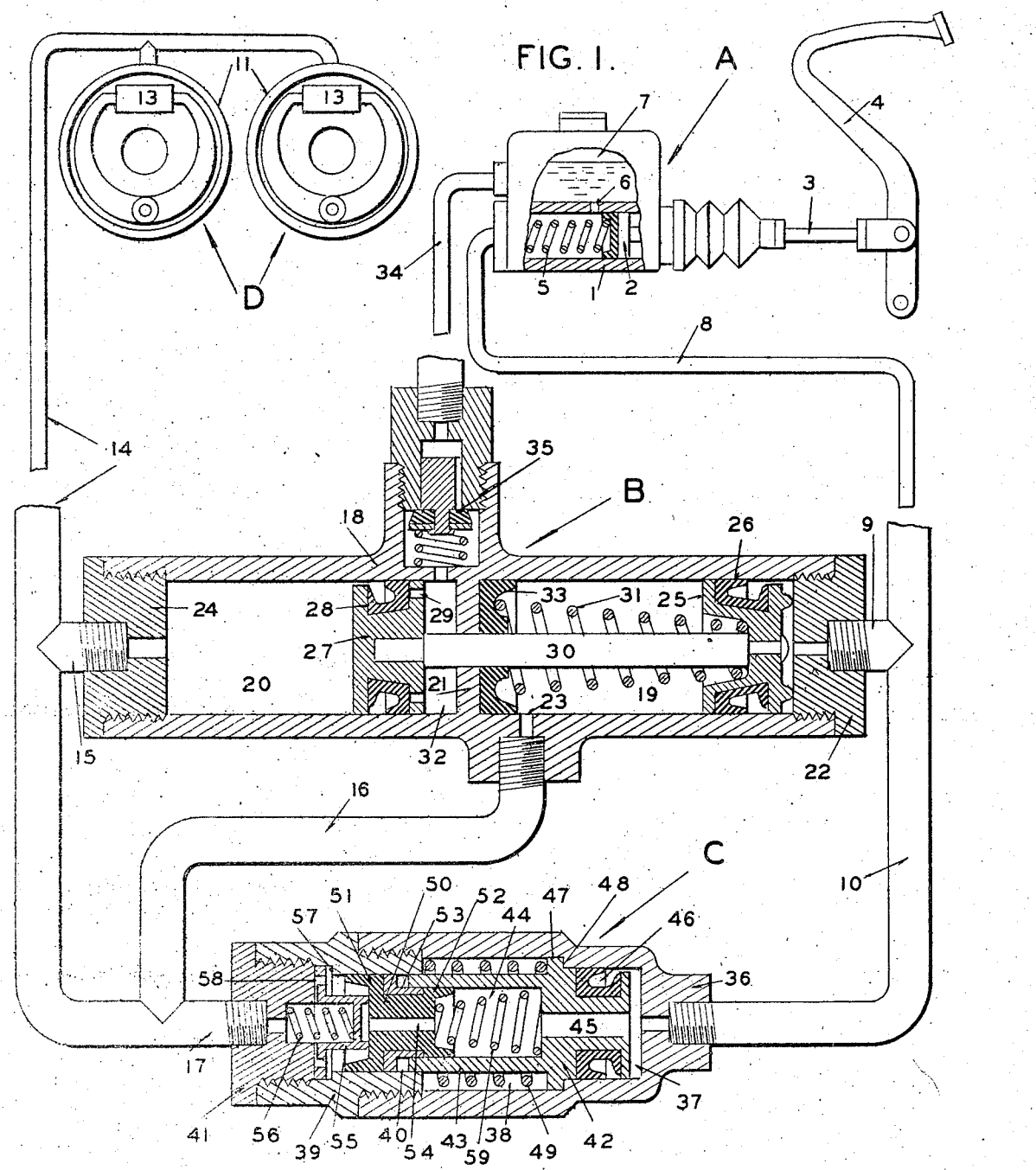
Figure 2:
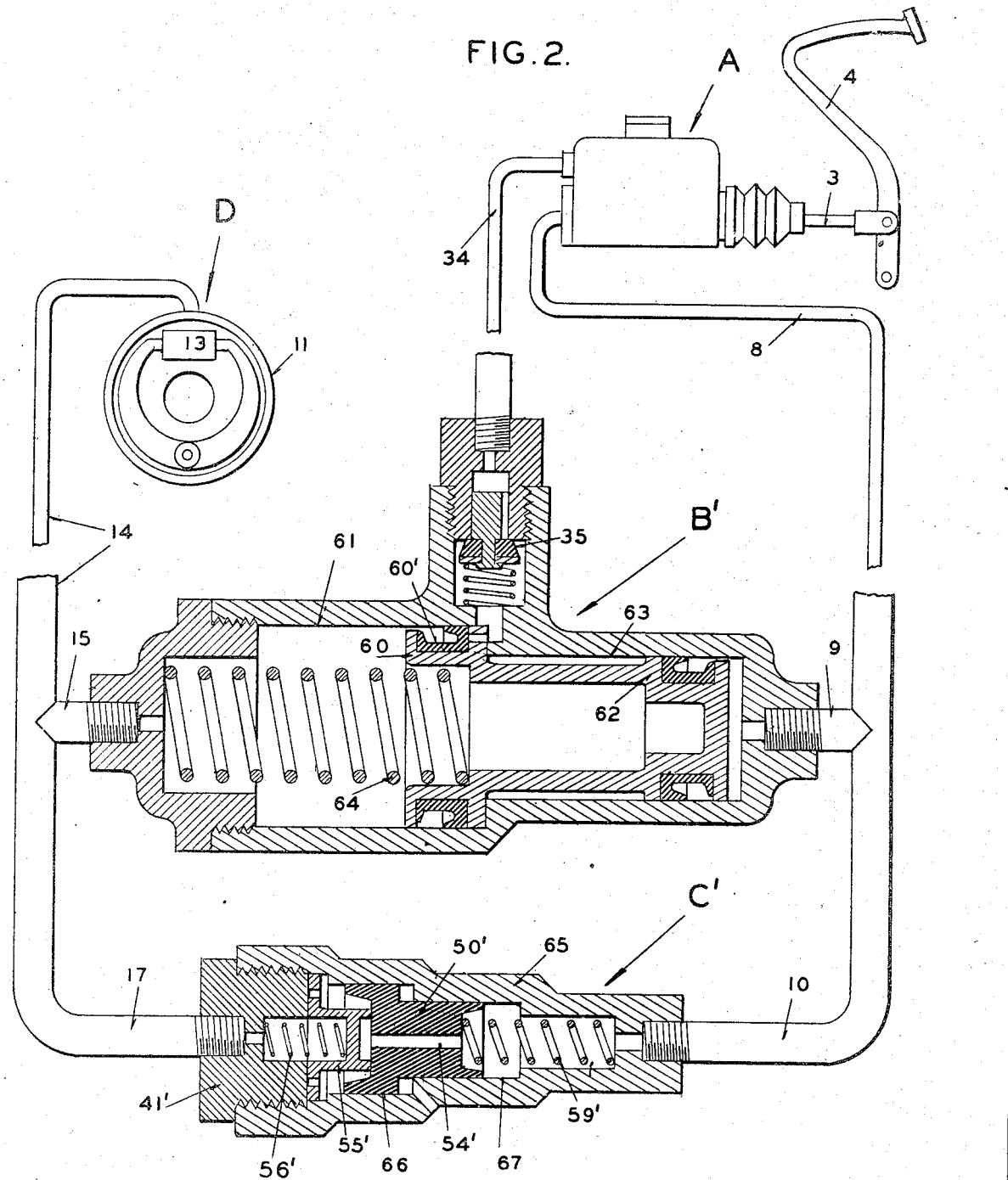

Other objects of my invention will become apparent from the following description taken in connection with the accompanying drawings in which Figure 1 is a schematic view of a fluid pressure actuating system embodying my invention, parts being shown in section; Figure 2 is a schematic view of another system showing in section a different construction of certain of the parts; and Figure 3 is a schematic view of still another system, the different parts thereof being shown in section.

Referring first to Figure 1, the system disclosed comprises, as its essential units, a master cylinder A, a large volume fluid displacing means B, a pressure-operated control valve C, and an actuated device D.

The master cylinder device A is of standard construction and comprises a cylinder 1 in which is reciprocable a piston 2, said piston being operated by a piston rod 3 and a brake pedal 4. The piston is normally biased to its inoperative position by a spring 5 and when in this position, it uncovers a porthole 6 which places the cylinder in two-way communication with the reservoir 7 positioned above the cylinder. The outlet of cylinder 1 is connected by a conduit 8 and branch conduits 9 and 10 to the units B and C.

The device D to be actuated is shown, by way of example, as a brake 11, the brake shoes 12 thereof being actuated by the fluid motor 13. This fluid motor has connected thereto a conduit 14 which communicates at two points with the large volume fluid displacing means B by means of branch conduits 15 and 16. Another branch conduit 17 places conduit 14 in communication with the pressure control valve means C.

The large volume fluid displacing means B comprises a casing 18 in which is provided axially aligned cylinders 19 and 20 divided by a partition 21. The right end of cylinder 19 communicates with the branch conduit 9 leading from the master cylinder device, the connection being established by the fitting 22 which also acts as an end wall for the cylinder. The forward end of cylinder 19 is provided with an outlet port 23 which is connected to branch conduit 16. The forward end of cylinder 20 is connected to branch conduit 15, the connection being made by a fitting 24 which also serves as an end wall for cylinder 20. Mounted for reciprocable movement in cylinder 19 is a piston 25 having a packing cup 26 for preventing fluid from passing the piston from the right end of cylinder 19 to the left end of said cylinder. Within cylinder 20 is a piston 27 having a packing cup 28 for preventing fluid from passing the piston from the left end of the cylinder to the right end. This packing cup, however, is capable of collapsing to permit fluid to pass the piston in the opposite direction, the flow of fluid being facilitated by the holes 29 in the piston.

Pistons 25 and 27 are connected together for simultaneous movement by a piston rod 30 which passes through the partition 21. A spring 31 acts on piston 27 and normally biases the pistons to the right ends of their cylinders. The piston rod is of such length that when piston 27 abuts the fitting 22 at the right end of the cylinder, piston 27 will be slightly spaced from partition 21 in order to provide a chamber 32 at the rear side of piston 27. A packing cup 33 is provided for the piston rod at partition 21 to prevent any fluid from flowing to chamber 32 from cylinder 19. In order that chamber 32 may be filled at all times with fluid, said chamber is connected by a conduit 34 to reservoir 7 of the master cylinder device A. Thus as piston 27 moves forwardly and the volume of chamber 32 increases, fluid can flow from the master cylinder reservoir to chamber 32 and maintain this chamber filled. Interposed between chamber 32 and conduit 34 is a spring-biased check valve 35, said check valve not appreciably restricting flow of fluid from reservoir 7 to chamber 32 but preventing any flow of fluid in the opposite direction.

The pressure-operated control valve C is embodied in a casing 36 provided with a bore 37 at one end and a slightly larger central bore 38, said bore 37 communicating with branch conduit 10 leading from the master cylinder device. A fitting 39 is screwed into casing 36 at the end opposite bore 37 and this fitting is provided with a cylinder 40. A second fitting 41 connects this cylinder with the previously referred to branch conduit 17 which communicates with fluid motor 13 of the brake. Positioned for limited reciprocable movement in bore 37 is a piston 42 having a cylindrical extension 43 forming a chamber 44, said chamber being in communication with bore 37 ahead of the right end of the piston by means of a passage 45 through the piston. The packing cup 46 seals the piston. The piston 42 is also provided with a flange 47 for cooperation with the shoulder 48 between bores 37 and 38 in order to limit the movement of piston 42 to the right. A relatively strong spring 49 surrounds the extension 43 and is interposed between flange 47 and fitting 39 to bias the piston to its extreme right position.

Cooperating with the cylindrical extension 43 and the larger cylinder 40 is a two-diameter piston 50, the large end 51 being positioned in cylinder 40 and the small end 52 being positioned in extension 43. Piston 50 is preferably made of rubber or like yieldable material and its central part is surrounded by a sleeve 53 cooperating with both cylinder 40 and extension 43. A passage 54 extends through piston 50 and this passage is adapted to be closed under certain conditions by a valve element 55. A spring 56 biases this element so that it will engage the end surface of the large portion 51 of piston 50 which surrounds passage 54. The element 55 is capable of having only limited movement under the action of spring 56, said movement being determined by the space between a shoulder 57 on the fitting 39 and the other fitting 41 between which a flange portion of element 55 is positioned. Fluid is permitted to flow around element 55 by way of the holes 58 in the flange. Flow of fluid through holes 58 is restricted when element 55 has engagement with fitting 41. The piston 50 is normally held in engagement with element 55 by a spring 59 which is interposed between the small end of piston 50 and the piston 42. This spring 59 is of greater strength than spring 56 which acts on element 55. Spring 59 determines the force which is necessary to act upon the large end 51 of piston 50 to move said piston to the right and cause passage 54 to be open.

Referring to the operation of the above described fluid pressure actuating system, all the elements of the various parts making up the units of the system will be in the positions shown when the system is inoperative. When it is desired to actuate fluid motor 13 to apply the device D, which in the instance shown is a brake, the master cylinder device A will be operated by actuating the pedal 4. As soon as piston 2 moves sufficiently to cut off the port 6, fluid pressure will begin to be developed by the master cylinder device. This fluid pressure will be effective on piston 25 of the large volume fluid displacing device B and also on pistons 42 and 50 of the valve means C. Since element 55 in the valve means C is in a position to close passage 54, fluid under pressure cannot pass through said valve means C. The pressure acting on piston 50 will maintain element 55 seated in the position shown. The fluid pressure developed by the master cylinder will be effective in moving piston 25 to the left and, of course, also piston 27 which is connected to piston 25 by the connecting rod 30. As both pistons 25 and 27 are simultaneously moved to the left, they will be effective in displacing fluid from their cylinders 19 and 20, which fluid will be effective in fluid motor 13 to actuate the brake shoes. If pistons 25 and 27 are assumed to have equal areas and their areas are also equal to the area of piston 2 of the master cylinder device A, it will be seen that the fluid displaced by pistons 25 and 27 will be twice that of the fluid being displaced by piston 2 since the fluid being displaced by piston 2 acts only on one piston. The pressure acting on piston 25 will be twice the pressure in cylinders 19 and 20. As piston 27 moves forwardly, chamber 32 at the rear thereof will be maintained filled with fluid flowing from the reservoir through pipe 34 and past check valve 35.

When the pressure in cylinders 19 and 20 and the connected lines reaches such a predetermined value that piston 50 in the valve means C will be moved to the right against spring 59, then the fluid under pressure developed by the master cylinder will be directly connected with fluid motor 13, thus equalizing the fluid pressure in the master cylinder device and also in all the lines and the cylinders 19 and 20. When passage 54 is first opened, the fluid pressure acting on the large end 51 will increase rapidly and due to the larger area of end 51, piston 50 will be moved quickly to the right against the spaced extension 43 and held in this position. When element 55 is unseated from piston 50, the inrush of the higher pressure will force the element to the position shown where holes 58 are restricted. This restriction of the flow of fluid past element 55 will result in the different fluid pressures equalizing slowly. Continued movement of the piston of the master cylinder will now result in the fluid pressure being developed thereby becoming effective in the fluid motor 13 and this motor will be actuated in the same manner as though the large volume fluid pressure displacing means B and the valve means C were eliminated.

When the valve means C becomes open and establishes equal fluid pressures on opposite sides of piston 25, spring 31 will become effective to return this piston 25 and also piston 27 to their normally inoperative positions as shown in Figure 1. The fluid in chamber 32 will not prevent rearward movement of both pistons 25 and 27 due to the fact that fluid can escape from this chamber past the packing cup 28 and into cylinder 20 ahead of piston 27. As the spring 31 returns the pistons, the fluid displaced by piston 25 will be forced down through open valve C to the opposite side thereof and also to the cylinder 20. The extra fluid necessary, to keep cylinder 27 filled flows from chamber 32 past cup 28. The movement of piston rod 30 will have no effect in changing the volume since, as it moves into cylinder 19, it moves out of chamber 32. In other words, the total fluid containing space in cylinder 20 ahead of piston 27, in chamber 32, and in cylinder 19 on both sides of piston 25 will always remain the same as the pistons move to the right. Since the pressure in all of this space is the same, the spring force is free to move the pistons. Thus it is seen that notwithstanding the continued actuation of the master cylinder device, the large volume fluid displacing pistons will return to their normally inoperative positions and be ready for a new stroke.

As the master cylinder device continues to develop pressure, a predetermined value will be reached wherein the pressure acting on piston 42 of the valve means will be great enough to force this piston to the left against the action of spring 49. When this occurs, the piston will move and carry with it the double-headed piston 50. When pistons 42 and 50 have moved sufficiently to the left to cause the face of the large end of piston 50 to engage element 55 and produce a pressure between said face and the element sufficient to prevent fluid from flowing through passage 54, the master cylinder device will be disconnected from the fluid motor 13 and pressure in the motor will no longer be increased. Thus it is seen that there is provided a safety means whereby the master cylinder device is prevented from developing an undesirable high pressure in the fluid motor. The maximum pressure that can be placed in the fluid motor will be determined by spring 49 and the area of piston 42.

When the master cylinder device is released, the fluid under pressure in the fluid motor will return to the master cylinder device through the valve means C. As the piston of the master cylinder is returned, the fluid pressure on the right hand side of piston 50 will drop to zero and consequently the pressure effective on the opposite side of piston 50 will cause it to be unseated from valve element 55. The fluid will be free to flow back through passage 54 until the pressure has dropped to such an extremely low value that spring 59 can cause piston 50 to again be seated against valve element 55.

If the master cylinder piston should only be partially retracted and then again moved forwardly when the fluid pressure in the system is below the predetermined pressure at which the valve means C opens, pistons 25 and 27 will again be operated until the pressure developed is great enough to open the valve means C in the manner already described.

Referring to Figure 2, there is shown a fluid pressure actuating system similar to that of Figure 1 except that the large volume fluid displacing means B has been replaced by a slightly different unit B' and the valve means C has been replaced by a valve means C' in which the high pressure safety means is eliminated.

In the unit B' there is a single piston 60 for displacing the large volume of fluid which has an area equal to both pistons 25 and 27 of the previously described unit B. This piston is positioned in cylinder 61 which has its forward end connected to branch conduit 15 leading to conduit 14 and fluid motor 13. Piston 60 is moved by a smaller piston 62 slidable in cylinder 63, this cylinder being connected to branch conduit 9 leading from the master cylinder device A. The pistons 60 and 62 are biased to their retracted positions by a spring 64. The piston 60 is provided with a packing 60' preventing fluid from flowing from the cylinder ahead of the piston to the rear of the piston but not preventing flow of fluid in the opposite direction. The rear of piston 60 is in communication with the master cylinder reservoir in the same manner as in Figure 1.

The valve means C', comprises a casing 65 having stepped bore 66 and 67, the smaller bore 67 being in communication with branch conduit 10 leading from the master cylinder and the large bore 66 being in communication with branch conduit 17 leading to conduit 14 and the fluid motor 13. Positioned within the stepped bores 66 and 67 is a double-headed piston 50' having a passage 54' extending therethrough. This piston 50' is biased by a weak spring 59' to a position wherein the surface of the large end of piston 50' engages element 55' acted upon by spring 56' and having limited movement between fitting 41' and casing 65.

The operation of the system shown in Figure 2 is identical with that shown in Figure 1 with the exception that the entire fluid pressure which can be developed by the master cylinder device can be caused to be effective in fluid motor 13 since there is no pressure limiting means in the valve C'. When the master cylinder device A is initially operated, fluid under pressure will be effective to move pistons 62 and 60 forwardly and cause the large piston 60 to displace a large volume of fluid into the lines in the master cylinder device. When a predetermined pressure is reached in fluid motor 13 and in lines 14, 15 and 17, piston 50' will be moved to the right to thus open up the passage 54' and thereby place the master cylinder device in direct communication with the fluid motor. This will cause the fluid pressure acting on pistons 62 and 60 to become equal and since piston 60 is assumed to be twice the area of piston 62, said pistons will be moved to the right. The fluid at the rear of piston 60 which has passed check valve 35 will flow past the packing cup 60' as piston 60 moves rearwardly.

In the fluid pressure actuating system shown in Figure 3, the large volume fluid displacing means and the pressure control valve means have been combined into a single unit E where a single large piston is employed to displace a large volume of fluid.

Referring now to the specific construction of this single unit, it comprises a casing 68 provided with a large cylinder 69 and a smaller cylinder 70. The large cylinder is connected to conduit 14 leading to the fluid motor 13 and the small cylinder is connected to conduit 8 leading from the master cylinder device A. The large cylinder 69 has mounted therein a piston 71 and the small cylinder 70 has mounted therein a piston 72, said pistons being connected by an integral sleeve 73 provided with stepped bores 74 and 75. A spring 76 biases the pistons to their retracted positions as determined by the shoulder 77 which is engaged by the large piston. The large piston has associated therewith a packing cup 78 which prevents flow of fluid past the piston from the portion of the cylinder ahead of the piston but does not prevent flow in the opposite direction. The piston 72 has associated with it a packing cup 79 for preventing fluid from flowing past the piston from the right end of cylinder 79. The casing 68 is formed to provide a reservoir 80 above cylinder 69 and this reservoir is in direct communication with the reservoir of the master cylinder device by way of a conduit 81. The reservoir 80 communicates with the extreme rear end of cylinder 69 by means of a passage 82 and a check valve 83 prevents fluid from returning to the reservoir from the rear end of said cylinder.

Slidably mounted within the stepped bores 74 and 75 is a two-diameter piston 84 having a through passage 85. The forward end of piston 84 is adapted to cooperate with a valve element 86 which is carried by a member 87 and backed by a spring 88. A small passage 89 through the piston and a passage 90 through member 87 permit the large end of piston 84 to be subject to the fluid pressure in the large cylinder 76.

The right end of bore 75 is in communication with cylinder 70 by way of a passage 91 in order that the small end of piston 84 may be subject to the fluid pressure developed by the master cylinder device. Slidably mounted in piston 72 is a plunger 92, the inner end of which cooperates with the small end of piston 84 and the outer end of which is adapted to engage a piston 93 which is slidable in a bore 94 carried by the closure plug 95 for the end of cylinder 70. The piston 93 has associated therewith a sealing element 96 and is backed by a spring 97 which normally biases the piston to engage a stop 98. By means of this construction it is seen that when pistons 71 and 72 are in their normally inoperative positions as shown, spring 97 will maintain piston 84 in engagement with valve element 86 in order to close passage 85 through the piston.

Referring to the operation of the structure of Figure 3, when the master cylinder A is actuated, fluid pressure will be developed and become effective on pistons 72, 84 and 93. This pressure will maintain piston 84 engaged with valve element 86 and no fluid can pass through passage 85. The fluid pressure will also move piston 93 against spring 97 and relieve the plunger 92 of any action of spring 97. As fluid pressure continues to be developed by the master cylinder device, piston 72 will be moved to the left as will also the large piston 71 since they are connected. The movement of the large piston by fluid pressure acting on the small piston will result in a large volume of fluid being displaced into line 14 and the fluid motor. This volume will be twice the volume displaced by the master cylinder device when the area of piston 71 is assumed to be twice as large as the area of piston 72 as already assumed.

When a predetermined pressure is reached by the master cylinder it will cause valve element 86 to be opened by pressure in passage 85 and then as the pressure in bore 74 increases, piston 84 will move to the right, thus preventing valve element 86 from reseating. The passage 85 will now be open and the master cylinder device placed in direct communication with the fluid motor. The pressure of the master cylinder and the lower pressure in cylinder 69 will equalize slowly due to the small passage 89. The pressure acting on piston 71 will become the same as the pressure acting on piston 72. As the area of piston 71 is greater than that of piston 72, the pistons will be moved to the right by a superior fluid force acting on piston 71 and also by the action of spring 76. The fluid which has entered the variable volume chamber at the rear of piston 71 during the movement of the piston forwardly will be pushed past the sealing cup 78 into the forward end of cylinder 69. When pistons 71 and 72 again reach their normally inoperative positions, as shown in the figure, passage 85 will continue to remain open due to the different forces acting on piston 84 and also because spring 97 cannot act on plunger 92 as the fluid pressure being developed by the master cylinder holds spring 97 compressed.

When it is desired to release the brakes, the brake pedal is released and fluid from the fluid motor returns to the master cylinder. When the fluid pressure falls to such a low value that spring 97 can be effective to move piston 92 to a position against stop 98, it will again be effective in moving piston 84 forwardly so that valve element 86 will be seated, thereby closing passage 85 and conditioning the valve means for another application by the master cylinder device.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure actuating system, a fluid motor for actuating a device, a source of pressure, a body of fluid for placing the source in communication with the motor, means for cutting off the source from communication with a portion of the body of fluid which is in communication with the motor but only when the pressure in the motor is below a predetermined value, means for transferring pressure to the portion of the body of fluid acting on the motor from that portion of the body of fluid acted upon by the source of pressure but only when the cut-off means is operative, said last named means comprising a movable member having different areas in contact with the cut-off portions of the body of fluid, and means for returning the movable member to its starting position when the cut-off means becomes inoperative and the motor is being operated by fluid pressure being directly communicated from the source.

2. In a fluid pressure actuating system, a fluid motor for actuating a device, a master cylinder device connected to communicate with the motor, means for preventing said communication when the pressure being developed by the master cylinder device is below a predetermined value, a fluid chamber connected to the motor, a movable member for developing fluid pressure in the chamber to thereby operate the motor, means for causing the fluid pressure developed by the master cylinder when below said predetermined value to move the movable member to thereby develop pressure in the chamber and motor, and means for returning the movable member to its non-pressure developing system when the master cylinder operates the motor as a result of a direct communication therewith.

3. In a fluid pressure actuating system, a fluid motor for actuating a device, means comprising a movable member for developing fluid pressure to operate the motor, a master cylinder device, means for operating the movable member by fluid pressure developed by the master cylinder device, means comprising a valve element movable from closed position to open position for placing the master cylinder device in direct communication with the fluid motor when the fluid pressure effective in the fluid motor reaches a predetermined value, and means for re-closing the valve element when the pressure developed by the master cylinder reaches a predetermined value higher than said first named predetermined pressure.

4. In a fluid pressure actuating system, a fluid motor for actuating a device, a fluid chamber connected to the motor, a movable member for developing fluid pressure in the chamber to thereby operate the motor, a master cylinder device, means for moving the movable member from a normally inoperative position by fluid pressure developed by the master cylinder device to thereby develop fluid pressure to operate the motor, means for connecting the master cylinder device directly with the fluid motor when the fluid pressure effective in the fluid motor is above a predetermined value, and means for returning the movable member to its normally inoperative position after the master cylinder device is directly connected to operate the motor and without a decrease in the fluid pressure effective in the fluid motor.

5. In a fluid pressure actuating system, a fluid motor for actuating a device, a fluid chamber connected to the motor, a master cylinder device connected to communicate with the motor, means for preventing said communication when the pressure developed by the master cylinder device is below a predetermined value, a movable member for developing fluid pressure in the chamber to thereby operate the motor, a fluid motor having its movable member connected to the first named movable member, means for causing the fluid pressure developed by the master cylinder when below said predetermined value to act on the movable member of the fluid motor and move the first named movable member to thereby develop pressure in the chamber and motor, said first named movable member having a larger area than the movable member of the fluid motor, and means for returning both movable members to their non-pressure developing positions when the master cylinder communicates directly with the device actuating motor and functions to operate it.

6. In a fluid pressure actuating system, a fluid motor for actuating a device, two fluid chambers connected to the motor, a movable member in each chamber for developing fluid pressure therein to thereby operate the motor, means for connecting said members together for simultaneous movement, a master cylinder device, means for operating the movable members by fluid pressure developed by the master cylinder device and comprising a movable member having an area less than the total area of the first named movable members, and means for connecting the master cylinder device directly with the fluid motor when the fluid pressure effective in the motor is above a predetermined value.

7. In a fluid pressure actuating system, a fluid motor for actuating a device, two cylinders of equal diameters each connected to the motor, a piston movable in each cylinder for developing fluid pressure to thereby operate the motor, means connecting the pistons together for simultaneous movement, a fluid motor for actuating the pistons and comprising a piston having an area equal to the area of the first named pistons, means for connecting said last named fluid motor to the master cylinder device for operation by fluid pressure developed by said master cylinder, and means for connecting the master cylinder device directly with the first named fluid motor when the fluid pressure effective in said fluid motor is above a predetermined value.

8. In a fluid pressure actuating system, a fluid motor for actuating a device, two cylinders of equal diameters each connected to the motor, a piston movable in each cylinder for developing fluid pressure to thereby operate the motor, means connecting the pistons together for simultaneous movement, a fluid motor for actuating the pistons and comprising a piston having an area equal to the area of the first named pistons, means for connecting said last named fluid motor to the master cylinder device for operation by fluid pressure developed by said master cylinder, means for connecting the master cylinder device directly with the first named fluid motor when the fluid pressure effective in said fluid motor is above a predetermined value, and means for returning the two first named pistons to their normally inoperative positions after said master cylinder device is directly connected to the first named fluid motor and functioning to operate it, said last named means embodying means for preventing a decrease in the fluid pressure effective in the first named fluid motor as said pistons are moved to their inoperative positions.

9. In a fluid pressure actuating system, a fluid motor for actuating a device, a master cylinder device connected to communicate with the motor, means for preventing said communication when the pressure being developed by the master cylinder device is below a predetermined value, a fluid chamber connected to the motor, a movable member for developing fluid pressure in the chamber to thereby operate the motor, means for causing the fluid pressure developed by the master cylinder when below said predetermined value to move the movable member from its normally inoperative position to thereby develop pressure in the chamber and motor, means for returning the movable member to its normally inoperative position after the master cylinder is connected to communicate with the motor and functions to operate it, and means for injecting fluid into the chamber as the movable member is returned, said injected fluid having the same pressure as the fluid already in the chamber.

10. In a fluid pressure actuating system, a fluid motor for actuating a device, a master cylinder device connected to communicate with the motor, means for preventing said communication when the pressure being developed by the master cylinder device is below a predetermined value, a fluid chamber connected to the motor, a movable member for developing fluid pressure in the chamber to thereby operate the motor, means for causing the fluid pressure developed by the master cylinder when below said predetermined value to move the movable member from its normally inoperative position to thereby develop pressure in the chamber and motor, means for returning the movable member to its normally inoperative position after the master cylinder is connected to communicate with the motor, means for injecting fluid into the chamber as the movable member is returned, said injected fluid having the same pressure as the fluid already in the chamber, and means for preventing the master cylinder device from communicating directly with the fluid motor when the pressure being developed thereby reaches a predetermined value greater than the first named predetermined value.

11. In a fluid pressure actuating system, a fluid motor for actuating a device, a cylinder connected to the fluid motor, a piston in said cylinder, a master cylinder device, means for moving said piston by fluid pressure developed by the master cylinder device, means for directly connecting the master cylinder device to the motor when the pressure effective in the motor is a predetermined value, means for maintaining a body of fluid at the rear of the piston, means for permitting said fluid to pass said piston and enter the cylinder ahead thereof when the piston is permitted to return to its normally inoperative position, and means for returning said piston when the master cylinder device is directly connected to the motor and functioning to develop pressure effective therein.

12. In a fluid pressure actuating system, a fluid motor for actuating a device, axially aligned cylinders of different diameters, interconnected pistons in said cylinders, a master cylinder device, conduit means for placing the larger cylinder in communication with the motor, conduit means for placing the smaller cylinder in communication with the master cylinder device, means for directly placing the master cylinder device in communication with the motor after the pistons are moved by operation of the master cylinder device and a predetermined pressure is caused to be effective in the motor by said movement, and spring means for returning the pistons to their starting positions when the master cylinder device is placed directly in communication with the motor and functioning to develop pressure effective therein.

13. In a fluid pressure actuating system, a fluid motor for actuating a device, axially aligned cylinders of different diameters, interconnected pistons in said cylinders, a master cylinder device, conduit means for placing the large cylinder in communication with the motor, conduit means for placing the smaller cylinder in communication with the master cylinder device, means for directly connecting the master cylinder device to the motor when the pressure effective in the motor is a predetermined value, means for maintaining a body of fluid at the rear of the large piston, and means for permitting said fluid to pass said piston and enter the cylinder ahead thereof but preventing passage of fluid in the opposite direction.

14. In a fluid pressure actuating system, a fluid motor for actuating a device, means for developing fluid pressure to operate the motor, a master cylinder device, means for operating the first named means by fluid pressure developed by the master cylinder device, means comprising a pressure-operated valve having a valve element movable from closed position to open position for directly placing the master cylinder device in communication with the motor when the pressure effective in the motor is a predetermined value, and means for closing said valve element when the pressure developed by the master cylinder reaches a predetermined value greater than the first named predetermined value, said last named means comprising a piston associated with the valve element and acted upon by the master cylinder developed fluid pressure and a spring resisting the movement of the piston to close the valve element.

STEVE SCHNELL.